United States Patent [19]
Hicks

[11] 3,760,526  
[45] Sept. 25, 1973

[54] HOLDER FOR LIVE SHRIMP OR THE LIKE

[76] Inventor: Thomas W. Hicks, 3121 Maple Dr., N.E., Suite 23, Atlanta, Ga. 30305

[22] Filed: Oct. 18, 1971

[21] Appl. No.: 190,102

Related U.S. Application Data

[63] Continuation-in-part of Ser. No. 169,636, Aug. 6, 1971.

[52] U.S. Cl............ 43/44.4, 43/41, 43/44.8
[51] Int. Cl........................................ A01k 83/06
[58] Field of Search............... 43/44.4, 44.6, 44.8, 43/44.2, 42.08, 42.22, 41, 41.2

[56] References Cited
UNITED STATES PATENTS

| | | |
|---|---|---|
| 3,200,532 | 8/1965 | Walton ............... 43/44.6 |
| 2,476,553 | 7/1949 | L'Huillier............ 43/44.6 X |
| 3,415,004 | 12/1968 | Whalen............... 43/44.4 X |
| 2,302,206 | 11/1942 | Gibson et al......... 43/42.08 X |
| 3,105,319 | 10/1963 | Whalen............... 43/44.4 |
| 2,767,505 | 10/1956 | Noyd.................. 43/44.6 |
| 2,765,574 | 10/1956 | Martin................ 43/44.4 |
| 3,156,066 | 11/1964 | Munyer............... 43/44.4 |

FOREIGN PATENTS OR APPLICATIONS

| | | |
|---|---|---|
| 787,080 | 6/1968 | Canada............... 43/44.6 |

Primary Examiner—Russell R. Kinsey  
Assistant Examiner—James H. Czerwonky  
Attorney—Harold D. Jones, Jr. et al.

[57] ABSTRACT

A holder for live shrimp or similar bait fish having a flexible shell defining a cavity sized and shaped to receive the forward body portion of the shrimp. The shell defines tail and head openings and may have a slot in its lower portion extending along its length which joins the tail and head openings. The lower appendages of the shrimp normally protrude from the cavity of the shell through the lower slot, and fork means may be movably connected to the shell and arranged to extend from the sides of the shell and curve laterally across the lower slot and between the lower appendages of the shrimp to hold the shrimp in the shell. A hook has its shank connected to the upper portion of the shell, and the bend in the hook extends downwardly with respect to the shell and is spaced behind the shell a distance sufficient to allow the free motion of the tail of the shrimp in the shell. The shell includes a plurality of protrusions along its length which extend from the inside of shell into the cavity. The protrusions include flexible tips.

11 Claims, 6 Drawing Figures

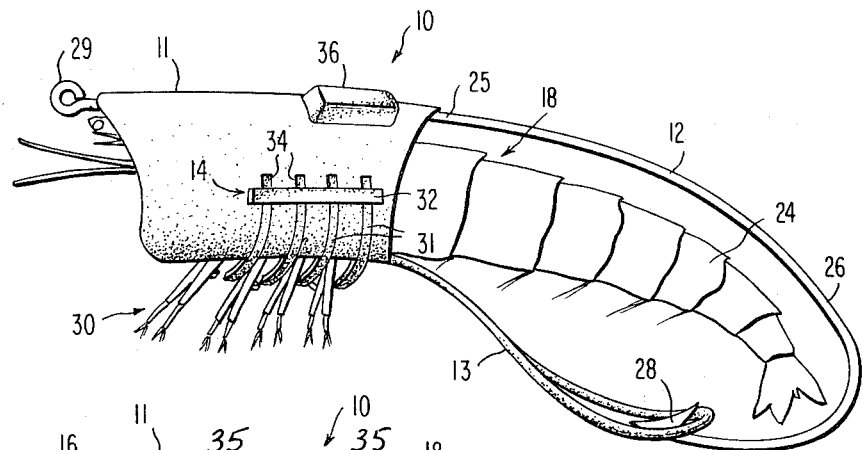
FIG.1
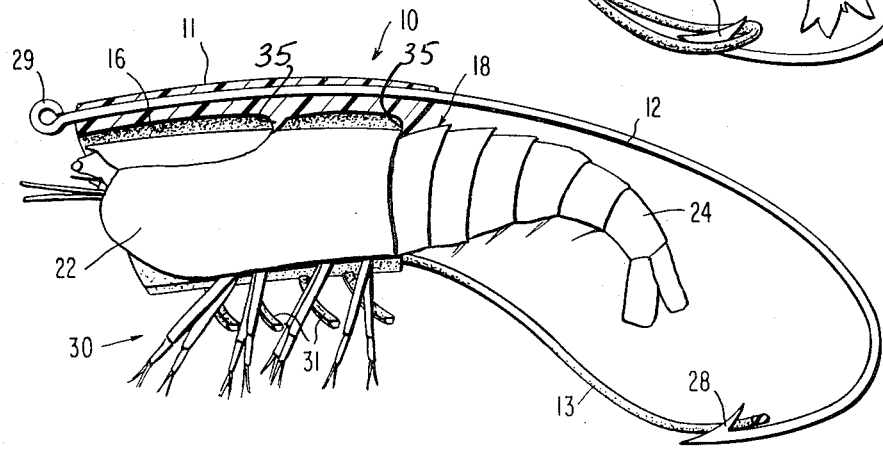
FIG.2
FIG.3
FIG.4
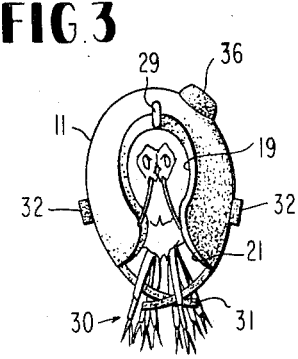
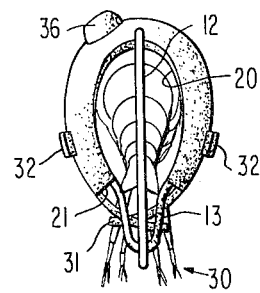
FIG.6
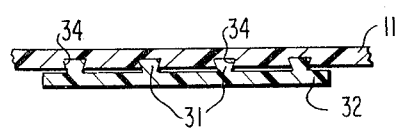
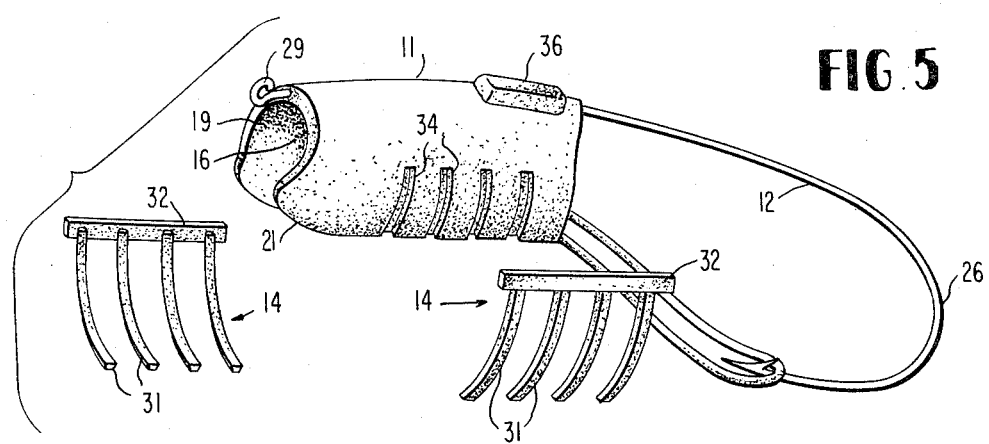
FIG.5

HOLDER FOR LIVE SHRIMP OR THE LIKE

CROSS-REFERENCE TO RELATED APPLICATION

This application is a continuation-in-part of application Ser. No. 169,636, filed Aug. 6, 1971, entitled "Live Bait Holder".

BACKGROUND OF THE INVENTION

When fishing for game fish, usually the best bait to attract the game fish is live bait. The natural motion of the live bait seems to attract the game fish more frequently than the various artificial lures or dead bait. Also live bait that appears to be injured seems to attract the game fish more frequently than uninjured live bait, apparently since the injured bait cannot escape as easily as live bait.

While various devices have been developed in an attempt to attach, confine or somehow connect live bait to a fishing line, the devices usually have caused the bait to die soon after its attachment to the device or to impede the motion of the bait in the water so that the bait does not retain its ability to swim, etc., and does not function to attract the game fish.

SUMMARY OF THE INVENTION

Briefly described, the present invention comprises a holder for shrimp or similar live bait which enables the shrimp to be connected to a fishing line with the desirable hooks and other devices, whereby the movement of the shrimp is not so restrained that the shrimp cannot swim, and the holder does not function to kill the shrimp. The holder comprises a flexible shell which defines a cavity sized and shaped to receive the front body portion of the shrimp. A tail opening in the shell is provided so that the tail of the shrimp extends through the opening and is left free to enable the shrimp to swim while confined in the shell. In addition, a head opening at the forward portion of the shell enables the shrimp to receive water while confined in the shell, and a slot is defined in the shell along its lower portion from its tail opening to its head opening. The lower appendages or legs of the shrimp normally protrude through the slot. Fork members are movably attached to the shell and are arranged to curve laterally over the lower slot between the sets of legs or lower appendages of the shrimp and they impede the longitudinal movement of the shrimp with respect to the shell and thus confine the shrimp in the shell. Hooks are connected to the shell in various arrangements so as to impale the game fish that attempts to take the shrimp. The hook arrangement usually includes one hook having its shank portion connected to the top portion of the shell and with the bend in the hook spaced behind and extending downwardly below the shell so as to provide freedom of movement of the tail of the shrimp. Also, in one embodiment of the invention a bubble is connected to one side portion of the shell so as to cause the shell and the shrimp confined therein to float in a tilted attitude.

Thus, it is among the objects of the present invention to provide a holder for live shrimp or the like for connecting the live shrimp to a fishing line and to a hook without entirely impeding the ability of the shrimp to swim or otherwise move and function in the water.

Another object of the invention is to provide a bait holder for live shrimp or the like which allows the shrimp to be connected to a fishing line without killing the shrimp or substantially impeding the ability of the shrimp to attract a game fish.

Other objects, features and advantages of the present invention will become apparent when taken in conjunction with the accompanying drawing.

BRIEF DESCRIPTION OF THE DRAWING

FIG. 1 is a side view of the holder for live shrimp or the like, showing a live shrimp inserted in the holder;

FIG. 2 is a side, cross sectional view of the holder with a shrimp;

FIG. 3 is a front view of the holder with a shrimp inserted therein;

FIG. 4 is a back view of the holder and its shrimp;

FIG. 5 is an exploded perspective view of the holder;

FIG. 6 is a detail illustration, in cross section of the fork means and shell.

DESCRIPTION OF THE PREFERRED EMBODIMENT

Referring now in more detail to the drawing in which like numerals indicate like parts throughout the several views, FIG. 1 shows a holder 10 for live shrimp or similar creatures and includes a shell 11, hook 12, hook guard 13 and fork means 14. Shell 11 defines an internal cavity 16 which is sized and shaped to receive the forward body portion of a shrimp 18 or the like. Shell 11 defines head opening 19 at its forward end (FIG. 3), tail opening 20 at its rear end (FIG. 4), and lower elongated slot 21 extending between forward head opening 19 and rear tail opening 20 along the lower portion of the shell. Head opening 19 is smaller than the dimensions of internal cavity 16 and the usual dimensions of the forward body portion 22 of a shrimp 18, and a shrimp usually is unable to move through the head opening of the shell. The head opening 19 provides the shrimp access to water so that the shrimp can continue its normal body functions when confined in the shell without being suffocated. Tail opening 20 is sized and shaped to allow the tail 24 to protrude through the tail opening behind the shell. Thus, the tail of the shrimp is able to function normally and the shrimp can swim and otherwise move about in the water.

Hook 12 has its shank portion 25 connected to the upper portion of shell 11, and the bend 26 of the hook is spaced rearwardly from shell 11 and curves downwardly about the tail 24 of shrimp 18. The point 28 of hook 12 is spaced below and behind shell 11 and extends generally forwardly of the shell. Hook 12 is sized and shaped so as to accommodate the tail 24 of the shrimp, so that the shrimp can move its tail and swim and otherwise move in the water. The eye 29 of hook 12 is positioned at the upper forward portion of shell 11, and the line extending from holder 10 to the fishing rod is normally connected to eye 29. Hook guard 13 comprises a loop of plastic material extending from the lower rear portion of shell 11, from opposite sides of lower slot 21, and the hook guard extends out to the point of hook 12. The hook guard 13 is flexible and tends to rest on the hook in the manner as shown in FIG. 1; however, hook guard 13 is sufficiently resilient to allow it to move inwardly of the hook 12, as when a fish strikes holder 10 so that the point and barb of the hook are easily exposed to impale the mouth cavity of the game fish.

The lower appendages or legs 30 of shrimp 18 normally protrude through the lower slot 21 of shell 11 in the manner illustrated in the drawing. Fork means 14 are movably connected to shell 11 and function as leg restraining means to maintain the legs or lower appendages of the shrimp in their protruding positions. A fork means is located on opposite sides of the shell, and each fork means comprises a set of generally parallel curved tines 31 connected together at their upper ends by tine support bar 32. Tines 31 are generally wedged-shaped in cross section (FIG. 6), and shell 11 defines tines slots 34 which are also wedged-shaped in cross section. Tines 31 are received in slots 34 and their mating wedge-shaped configurations cause the tines to be slidably received in the slots 34. Slots 34 and tines 31 are arranged so that the fork means can be moved in an upward direction on opposite sides of shell 11 where the tines are in their retracted positions and lower slot 21 of shell 11 is open, or the fork means can be moved downwardly from about the sides of shell 11 by sliding the tines through their slots 34 so that the tines protrude across lower slot 21 of the shell. When the tines are in their down protruding position as illustrated in the drawings, they extend between the lower appendages or legs 30 of the shrimp at the area immediately beneath the body portion of the shrimp. The space between the tines 31 of each fork means 14 is such that the tines 31 tend to bind the shrimp legs and partially immobilize the legs of the shrimp which a wedge or clamp fit. Thus, the lower appendages or legs 30 of the shrimp are confined in their protruding position through lower slot 21 of shell 10, and the shrimp 18 is thus retained in shell 11.

The upper inside surface of the shell cavity 16 includes downwardly and forwardly extending protrusions 35 which are located to engage the rear upper edges of the shell layers of the shrimp and to assist in retraining the rearward movement of the shrimp with respect to its shell and confine the shrimp in the shell.

In one embodiment of the invention, air blister 36 is connected to the outer surface of shell 11 at a position offset from the centerline of the shell. Air blister 36 functions as buoyant means and tends to cause shell 11 together with its shrimp 18 to float or rise in the water. The buoyant means can also comprise cork or other low density material. In another embodiment of the invention the entire shell 11 or selected portions of the shell are fabricated of a material having a density lower than water so that the shell tends to float. The shell density can be varied so that the shell and its hook tend to sink, or the shell tends to float with enough buoyancy only to suspend the shell and hook in the water, or as preferred, the shell and its hook tend to float to the surface of the water. If the shell and hook tend to float, the bait fish in the shell usually will struggle to get beneath the surface, thus attracting the game fish, and if the bait fish should escape or become injured by striking a game fish, the bait will rise to the surface of the water where it can be seen by the fisherman. Thus, the low density shell or a low density portion of the shell functions as buoyant means.

Shell 11 can be fabricated from various materials, such as polystyrene or other thermo plastic materials, and the shell normally will be fabricated of transparent material so that the features of the shrimp confined in shell 11 can be viewed by the game fish.

While the embodiment of the invention disclosed herein has been described as a holder for shrimp or the like, it should be obvious that the invention can be modified to accommodate other creatures, including fish and other fresh water and salt water creatures. Also, if the bait is to be used for deep fishing, the bait holder can be manufactured without the air blister 36 or the air blister can be punctured to allow its air to escape. Moreover, while this invention has been described in detail with particular reference to a preferred embodiment thereof, it will be understood that other variations and modifications can be effected within the spirit and scope of the invention as described hereinbefore and as defined in the appended claims.

I claim:

1. A holder for confining live shrimp bait or the like without killing the shrimp comprising a resilient shell defining a cavity which generally conforms to the size and shape of the front body portion of the shrimp, a tail opening at its rear end through which the tail of the shrimp normally protrudes, said shell defining a lower slot extending forwardly along its lower portion from its tail opening to its head opening of a width sufficient to allow at least some of said lower appendages of a shrimp in said shell to protrude through the lower slot, and fork means connected to each side of said shell with tines extending across said lower slot for maintaining the appendages of the shrimp in the shell protruding through said lower slot.

2. The holder of claim 1 and wherein said fork means comprises fork means with curved tines connected to opposite sides of said shell and slidable around said shell.

3. The holder of claim 1 and wherein said shell defines a mouth opening in the front portion thereof in alignment with the normal position of the mouth of the shrimp when a shrimp is properly positioned in said shell so that the shrimp can receive water through said mouth opening.

4. The holder of claim 1 and wherein said shell defines a mouth opening in the front portion thereof in alignment with the normal position of the mouth area of a shrimp properly positioned in said shell, said mouth opening being connected to said lower slot.

5. The holder of claim 1 and further including engaging means protruding from the upper portion of said shell inwardly to the cavity defined by said shell, said engaging means being located to engage the shrimp properly positioned in said shell at the junction of the outer body shell layers and to restrain the movement of the shrimp through its tail opening.

6. A bait holder for confining shrimp or other live bait comprising a flexible shell defining a cavity for receiving the forward body portion of the shrimp, a tail opening at one end of said shell and a head opening at the other end of said shell, a slot defined along the length of the lower portion of said shell and intersecting said head opening and said tail opening through which the lower appendages of the shrimp in said shell normally protrude, means mounted on said shell for maintaining the lower appendages of the shrimp protruding through said slot, and said shell including protrusions extending from said shell into the cavity defined by said shell for engaging the edges of the body shell segments of the shrimp whereby the shrimp is restrained from moving rearwardly with respect to the shell.

7. A bait holder for live shrimp or the like comprising a flexible shell defining a cavity therein for receiving the forward body portion of a shrimp and defining a tail opening through which the tail portion of a shrimp in said shell normally extends, said shell including a plurality of forwardly and internally extending engaging means along its length and protruding internally from the inner surface of said shell into said cavity at and forwardly from said tail opening, said engaging means having flexible tips and being sized and shaped to engage the shell layers of the shrimp in said shell for maintaining the forward body portion of the shrimp in said shell, and hook means connected to said shell.

8. The bait holder of claim 7 and wherein said hook means comprises a hook with a shank portion connected to said shell, a bend positioned behind said shell and a point behind said shell and extending generally below and forwardly of said shell, said bend being spaced from said shell a distance sufficient to allow freedom of movement of the tail of a shrimp received in said shell.

9. A holder for confining live shrimp or the like without killing the shrimp comprising a flexible shell defining an internal cavity which generally conforms in size and shape to the size and shape of the front body portion of a live shrimp, a tail opening defined in the rear end of said shell through which the tail of a shrimp positioned in said shell normally protrudes, a head opening defined in the forward end of said shell of a size smaller than the maximum opening of the internal cavity of said shell to inhibit the escape of the shrimp therethrough and of a size sufficient to allow the forward tentacles of the shrimp in said shell to protrude and to provide the shrimp access to water so that the shrimp generally can continue its normal body functions when confined in said shell, said shell including a plurality of protrusions along its length and extending from the inside surface of said shell at and forwardly from said tail opening and extending forwardly and into said internal cavity for engagement with the shell layers or the like of the shrimp in said shell to inhibit rearward movement of the shrimp with respect to said shell, said protrusions including flexible tips, and a hook connected to said shell.

10. The holder of claim 9 and further including buoyant means connected to a portion of said shell off set from the longitudinal centerline of said shell so that the holder and a shrimp positioned therein tend to float in a tilted attitude.

11. The holder of claim 9 and wherein said shell is transparent.

* * * * *